Patented Dec. 4, 1945

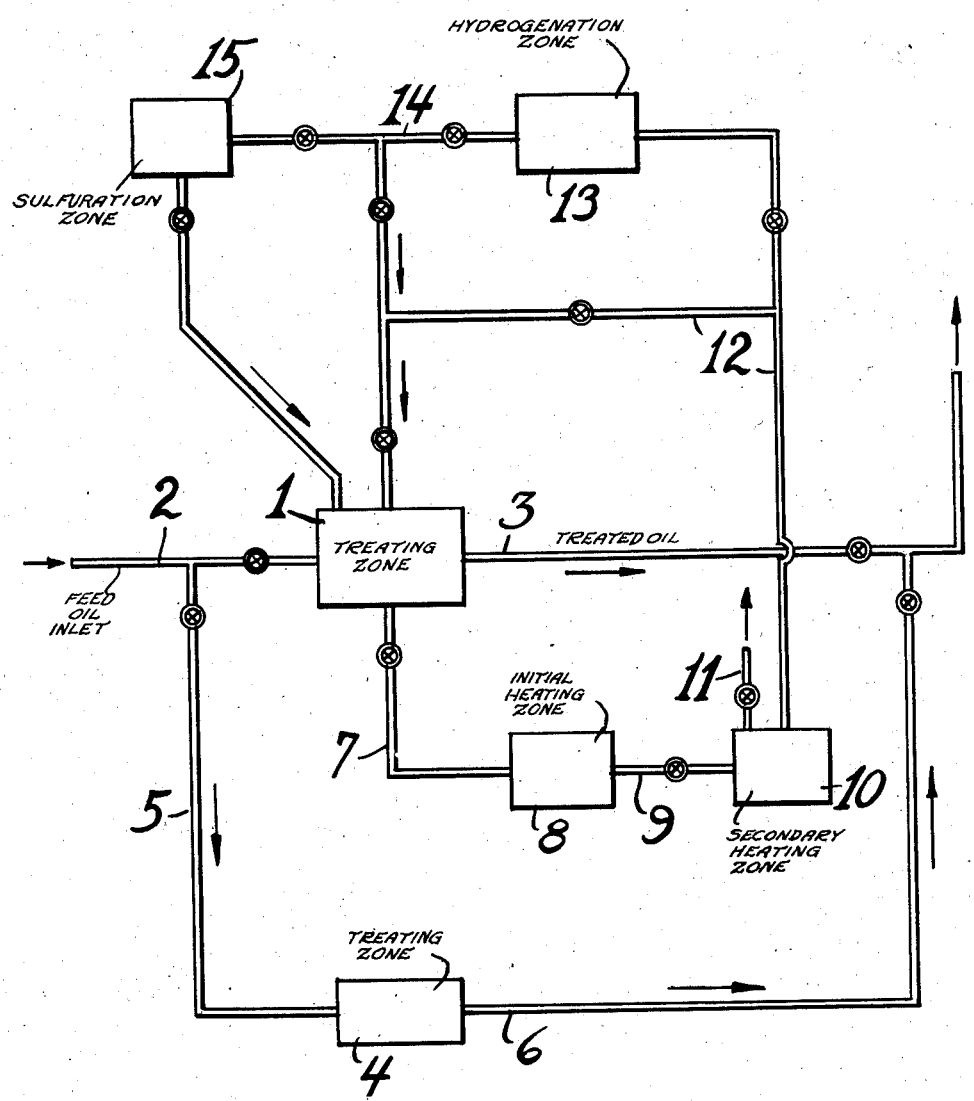

2,390,323

UNITED STATES PATENT OFFICE 2,390,323

REGENERATION OF SPENT CATALYSTS

Edward B. Peck, Elizabeth, N. J., assignor to Standard Oil Development Company, a corporation of Delaware Application March 1, 1941, Serial No. 381,251

2 Claims. (Cl. 252—242)

The present invention is concerned with a process for the regeneration of spent catalysts utilized in various refining operations. The invention especially relates to a process for the regeneration of catalysts selected from the class consisting of nickel and cobalt which are utilized in various hydrogenation, cracking, reforming, hydroforming, hydrocarbon synthesis, and related operations.

It is well known in the art, particularly in the refining of petroleum oils, to carry out hydrogenation, hydroforming, hydrocarbon synthesis, cracking, reforming and related operations utilizing various catalytic materials which are usually supported on suitable base carriers, such as various clays, tungsten, and the like. In these operations in which a catalyst is employed, particularly in the treatment of petroleum oils, the catalyst after a certain time period reacts with sulfur if it is not a sulfur catalyst and also becomes coated with various carbonaceous and related substances which materially impair its efficiency. This is particularly the situation when the feed materials comprise petroleum hydrocarbons, especially when elevated temperatures and pressures are employed. It is therefore necessary to regenerate the catalyst and to revivify the same which includes the removal of the carbonaceous materials.

This is usually accomplished by burning the catalyst at various temperatures and pressure conditions in order substantially completely to free the same of the objectionable carbonaceous materials which results in the formation of the sulfate. While this operation is entirely satisfactory for the treatment of certain materials, as for example, for the treatment of iron oxide, iron sulfide, and the like, which substances are employed as catalysts in various operations, it is not particularly suitable for the regeneration of catalysts such as nickel oxide, nickel sulfide, cobalt oxide and cobalt sulfide.

For example, if the fresh catalyst comprises ferric oxide, which catalyst upon continuous use in the presence of a sulfur-containing oil deteriorates to ferrous sulfide, the same may be readily regenerated by oxidizing in the presence of steam. Under these conditions, the ferrous sulfide reacts to form ferric sulfate which latter substance further reacts to form the ferric oxide and sulfur tri-oxide. In an operation of this character, the ferric oxide is substantially completely regenerated in an efficient manner and at a relatively low temperature of about 600° C.

On the other hand, this operation cannot be readily utilized in the regeneration of spent catalyst comprising cobalt and nickel, such as cobalt oxide, cobalt sulfide, nickel oxide, and nickel sulfide. This is due to the fact that if a spent catalyst such as nickel sulfide be heated immediately to 600° C. the reaction will not go to completion with respect to nickel sulfate. Furthermore, it is not practical to raise the temperature substantially above 600° C. due to the fact that it may adversely affect the base carrier and cause further deleterious results. It has therefore been the practice to use non-reducible oxides, such as zirconium oxide, aluminum silica oxide, and the like, in many operations even though the nickel and cobalt oxides and sulfides in many instances are superior. This was due to the fact that the former type of catalyst could be readily revivified with a small amount of catalyst loss whereas this was not the situation with respect to the latter type of catalyst.

I have, however, now discovered a process by which catalysts of the type of nickel oxide and the like may be readily regenerated which comprises utilizing a particular sequence of stages. In an initial stage the coke or tar is burned off, the catalyst is subjected in a secondary stage to oxidizing atmosphere, preferably in the presence of a large amount of steam and at a particular temperature for a time period necessary to form the desired constituents. The partially regenerated catalyst is then subjected in a tertiary stage to treatment adapted to regenerate completely the same. My invention may be readily understood by reference to the diagrammatical drawing illustrating one embodiment of the same.

For the purpose of description it is assumed that the catalyst comprises nickel oxide and that the same is utilized in the alkylation of a sulfur-containing petroleum oil. The petroleum oil is introduced into contacting zone 1 by means of feed line 2 wherein it is treated with a catalyst comprising nickel oxide supported on a tungsten carrier. Temperature and pressure conditions are adjusted in zone 1 to secure the desired alkylation of the oil. The treated oil is withdrawn from zone 1 by means of line 3 and further handled as desired. After the activity of the catalyst has decreased in zone 1 to a predetermined efficiency the feed oil is passed through zone 4 containing a similar catalyst by means of line 5, withdrawn by means of line 6 and handled as desired. The method used with respect to regenerating the catalyst in zone 4 is entirely similar with respect to the method of regenerating the catalyst removed from zone 1.

The spent nickel catalyst comprising carbonaceous materials and nickel sulfide, is withdrawn from zone 1 by means of line 7 and subjected to an initial oxidation treatment in zone 8. In this zone temperature and pressure conditions are initially adjusted to remove the carbonaceous constituents from the catalyst whereby a portion of the nickel is converted to the sulfate. After the carbonaceous constituents are removed, the treatment is continued at particular temperature conditions which are adapted and regulated so that the ratio of nickel sulfide dissolved in nickel sulfate is approximately 1 to 3. The catalyst comprising a solid solution of nickel sulfide dissolved in nickel sulfate which contains about 25 mol percent nickel sulfide and 75 mol percent nickel sulfate is withdrawn from zone 8 by means of line 9 and passed into secondary heating zone 10 wherein the temperature of the same is raised and controlled whereby a reaction between the nickel sulfide and the nickel sulfate occurs, resulting in the formation of nickel oxide and sulfur dioxide. The sulfur dioxide is removed by means of line 11 while the nickel oxide is removed by means of line 12 and recycled to treating zone 1.

The process of the present invention may be widely varied. The invention essentially comprises regenerating spent nickel oxide, nickel sulfide, cobalt oxide, and cobalt sulfide by subjecting the same to two distinct heat treatments. In the initial heat treatment the temperature and pressure conditions are regulated to remove the objectionable carbonaceous constituents and so as to form a predetermined proportion of the sulfide to the sulfate. In this zone the pressure employed is preferably atmospheric pressure and the temperature is in the general range from about 475° C. to 575° C., preferably in the range from about 500° C. to 550° C. Conditions in general are so regulated to produce a solution of nickel sulfide dissolved in nickel sulfate in which the proportion is approximately 20 to 30 mol percent nickel sulfide to 70 to 80 mol percent nickel sulfate. Every effort is made to secure a 25 mol percent nickel sulfide dissolved in 75% nickel sulfate.

In the secondary heating stage the solution of nickel sulfide and nickel sulfate is held at a temperature adapted to produce a reaction between the sulfide and sulfate resulting in the formation of nickel oxide and sulfur dioxide. This is secured by regulating the temperature in the general range from about 590° C. to 650° C., preferably in the range from about 600° C. to 625° C.

Under certain conditions it may be desirable to utilize relatively pure nickel or pure cobalt in the treating zone. If this type of operation be employed, the cobalt removed from zone 10 by means of line 12 is passed to zone 13 wherein the same is hydrogenated at a temperature in the general range from about 350° C. to form the pure metal which is removed by means of line 14 and passed to zone 1. If it is preferred that the catalyst comprise the sulfide of the cobalt or nickel, this may readily be secured by passing the cobalt or nickel removed from zone 13 to zone 15 wherein the sulfide of the metal is formed by known means. The sulfide may then be passed to zone 1 or zone 4 as desired.

In order to illustrate my invention further, the following example is given which should not be construed as limiting the same in any manner whatsoever.

*Example*

In various operations it was found that if the nickel sulfide were heated at a temperature of about 600° C., it was not possible to fully reactivate the catalyst.

In another operation it was found that if the nickel sulfide were heated to a temperature of about 525° C. and held at that temperature and then raised to 600° C., the nickel was entirely converted to oxide.

Although I do not wish to be restricted, it is my belief that the mechanism of the operation is as follows:

When the nickel sulfide is heated at a temperature of about 500° C., a portion of the nickel sulfide is converted to the nickel sulfate. This portion comprises approximately 75 mol percent as compared to the unconverted nickel sulfide. After equilibrium is reached with respect to the nickel sulfide and nickel sulfate by raising the solid solution of nickel sulfide and nickel sulfate to 600° C., the following reaction occurs:

$$NiS + 3NiSO_4 = 4NiO + 4SO_2$$

Thus it is apparent that the oxide is fully recovered.

What I claim as new and wish to protect by Letters Patent is:

1. The process for the regeneration of a catalyst of the class consisting of nickel and cobalt mounted on a tungsten carrier, which catalyst has been converted to the sulfide in the refining of petroleum oil, which comprises heating the sulfide at about 500° C. in the presence of steam thereby oxidizing said sulfide to a solid solution formed of 75% sulfate and 25% sulfide, and thereafter raising the temperature of the solid solution to about 600° C. to cause the sulfate to oxidize the sulfide to oxide.

2. The process for the regeneration of nickel catalyst on a tungsten carrier which catalyst has been converted to nickel sulfide in the refining of petroleum oil, which comprises heating the nickel sulfide at about 500° C. in the presence of steam thereby oxidizing said sulfide to a solid solution formed of 75% nickel sulfate and 25% nickel sulfide, and thereafter raising the temperature of the solid solution to about 600° C. to cause the nickel sulfate to oxidize the nickel sulfide to nickel oxide.

EDWARD B. PECK.